US010787233B2

(12) United States Patent
Gatesoupe et al.

(10) Patent No.: US 10,787,233 B2
(45) Date of Patent: Sep. 29, 2020

(54) FLOATING DEVICE SUPPORTING AN OFFSHORE WIND TURBINE, AND CORRESPONDING FLOATING WIND TURBINE UNIT

(71) Applicants: NASS & WIND INDUSTRIE, Lorient (FR); CETEAL, L'hay-les-Roses (FR)

(72) Inventors: Julien Gatesoupe, Guidel (FR); Pascal Heisel, Evette-Salbert (FR); Yves Marin, Rezé (FR)

(73) Assignee: Ceteal, L'Hay Les Roses (FR)

( * ) Notice: Subject to any disclaimer, the term of this patent is extended or adjusted under 35 U.S.C. 154(b) by 5 days.

(21) Appl. No.: 16/312,085

(22) PCT Filed: May 29, 2017

(86) PCT No.: PCT/FR2017/051335
§ 371 (c)(1),
(2) Date: May 9, 2019

(87) PCT Pub. No.: WO2017/220878
PCT Pub. Date: Dec. 28, 2017

(65) Prior Publication Data
US 2019/0367136 A1    Dec. 5, 2019

(30) Foreign Application Priority Data

Jun. 20, 2016  (FR) ...................................... 16 55714

(51) Int. Cl.
| | | |
|---|---|---|
| *B63B 35/44* | (2006.01) | |
| *F03D 13/25* | (2016.01) | |
| *B63B 1/12* | (2006.01) | |

(52) U.S. Cl.
CPC .............. *B63B 35/44* (2013.01); *F03D 13/25* (2016.05); *B63B 2001/126* (2013.01);
(Continued)

(58) Field of Classification Search
CPC .. B63B 1/10; B63B 1/12; B63B 1/125; B63B 1/126; B63B 1/128; B63B 35/44;
(Continued)

(56) References Cited

U.S. PATENT DOCUMENTS

| | | | | |
|---|---|---|---|---|
| 7,156,586 B2* | 1/2007 | Nim | ........................ | B63B 35/44 405/195.1 |
| 8,471,396 B2* | 6/2013 | Roddier | .................. | F03D 17/00 290/44 |

(Continued)

FOREIGN PATENT DOCUMENTS

| | | |
|---|---|---|
| JP | 2015519489 | 7/2015 |
| WO | WO2004061302 | 7/2004 |

(Continued)

OTHER PUBLICATIONS

French Search Report for FR 1655714 dated Mar. 7, 2017.
International Search Report and Written Opinion for PCT/FR2017/051335 dated Sep. 7, 2017.

*Primary Examiner* — Daniel V Venne
(74) *Attorney, Agent, or Firm* — Patterson Thuente Pedersen, P.A.

(57) ABSTRACT

A floating device for supporting an offshore wind turbine, comprising a central floating pillar for fixedly receiving a tower of the wind turbine, at least three peripheral floaters, and one leg per floater, each leg extending in a longitudinal direction that runs radially in relation to the central pillar; each leg has a proximal end that is secured to the central pillar, and a distal end that is secured to the floater; the legs include an outer tubular element, which extends in the longitudinal direction of the leg and has a curved cross-section perpendicularly to the longitudinal direction, and an inner tubular element, which extends in the longitudinal direction of the leg and has a polygonal cross-section perpendicularly to the longitudinal direction, the polygonal
(Continued)

cross-section being inscribed in the curved cross-section. The invention also relates to a floating wind turbine unit comprising the device and a wind turbine.

10 Claims, 5 Drawing Sheets

(52) U.S. Cl.
CPC ... *B63B 2001/128* (2013.01); *B63B 2035/446* (2013.01); *F05B 2240/93* (2013.01)

(58) Field of Classification Search
CPC ........ B63B 2035/442; B63B 2035/443; B63B 2035/446; F03D 13/25; F05B 2240/93
USPC ............. 114/61.1, 61.12, 61.14, 61.2, 61.22, 114/264–267
See application file for complete search history.

(56) References Cited

U.S. PATENT DOCUMENTS

| | | | |
|---|---|---|---|
| 9,394,035 B2 * | 7/2016 | Dagher | B63B 21/50 |
| 9,738,351 B2 * | 8/2017 | Bergua | B63B 21/502 |
| 10,202,170 B2 * | 2/2019 | Dagher | B63B 39/03 |
| 10,308,328 B2 * | 6/2019 | Siegfriedsen | B63B 21/50 |

FOREIGN PATENT DOCUMENTS

| | | |
|---|---|---|
| WO | WO2011137903 | 11/2011 |
| WO | WO2015048147 | 4/2015 |

* cited by examiner

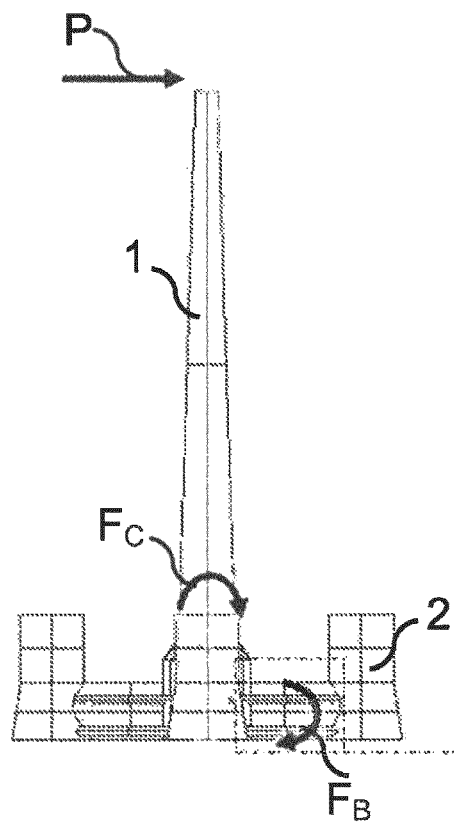
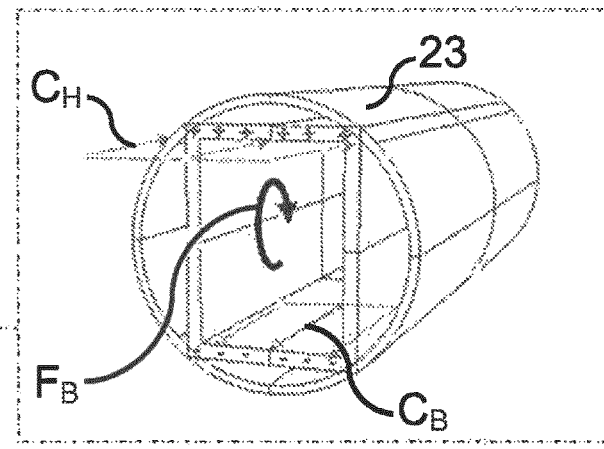
Fig.8a        Fig.8b
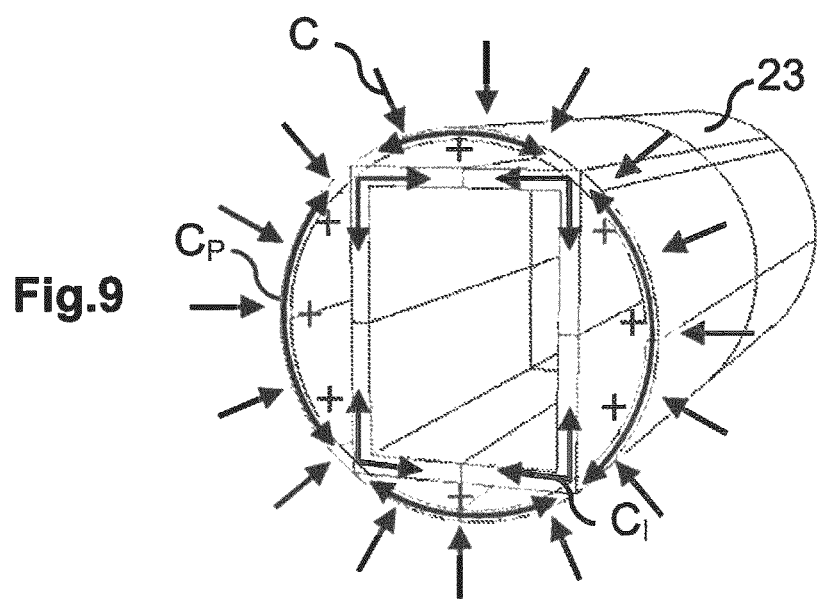
Fig.9

FLOATING DEVICE SUPPORTING AN OFFSHORE WIND TURBINE, AND CORRESPONDING FLOATING WIND TURBINE UNIT

RELATED APPLICATIONS

The present application is a National Phase entry of PCT Application No. PCT/FR2017/051335, filed May 29, 2017, which claims priority to FR 1655714, filed Jun. 20, 2016, the contents of each being incorporated herein by reference in their entireties.

TECHNICAL FIELD

The invention relates to the field of the floating wind turbine. It relates more particularly to a floating device for supporting an offshore wind turbine and a floating wind turbine unit comprising device and a wind turbine.

BACKGROUND

Floating wind turbine units, comprising a floating device and an offshore wind turbine supported by the floating device, are known. The wind turbine comprises a tower and a turbine. Among these wind turbine units, there are for example HYWIND™, WINDFLOA™, IDEOL™.

One of the main difficulties encountered by floating devices for supporting an offshore wind turbine is the ability to support the fatigue loads, due to the repetitive movements imposed on the floating wind turbine unit in particular by the turbine, the wind and wave swells, and the extreme loads generated in case of a rough sea. A disadvantage of current floating devices is that they are designed from materials that are not particularly resistant to the fatigue loads and to extreme loads. Indeed, they are conventionally designed from metal and in particular from steel. The dimensioning of such structures in order to resist the fatigue loads and the extreme loads mentioned hereinabove therefore leads to voluminous, heavy and expensive structures.

This results in a manufacturing process for these structures that is complex and expensive. In particular, given the size of these structures, large-size dry docks are necessary in order to manufacture them.

These various disadvantages limit in particular the power of wind turbines that the floating devices of such units can support.

The current floating units are penalized not only by the use of materials that are not particularly resistant to fatigue, but also by the choice of a geometry that does not optimally limit the generation of new loads exerted on the unit. The loads generated are for example gravity loads linked to the inclination of the tower of the wind turbine in relation to the vertical direction, inertial loads linked to the movements of the tower of the wind turbine around its position at rest or loads resulting from the hydrostatic pressure being exerted on the walls of the floating device.

Moreover, the current floating wind turbine units commonly use elements that have solid volumes in order to resist the fatigue loads and the extreme loads. However, these solid volumes do not participate in the overall floatability of the system, which requires both increasing the size of the floating elements in order to increase their floatability and increasing the overall size of the system in order to support the bending forces that are transmitted between the floating elements and the non-floating elements.

SUMMARY

Embodiments of the invention propose a solution that aims to overcome the aforementioned disadvantages.

Thus, the first objective of embodiments of the invention is to support the fatigue loads and the extreme loads that are exerted on the floating device while still limiting the generation of new loads in particular on the turbine. This is provided through the use of several materials each used for their advantages from a mechanical standpoint and placed at particular locations of the structure in order to take up under the best conditions the forcers transmitted both by the turbine, through the tower fixed on the floating device, and by the marine environment. This is also provided by the geometry of the various elements in such a way as to limit the generation of new loads and to provide the elements with a neutral or positive floatability.

Another objective of embodiments of the invention is to retain a similar behavior regardless of the orientations of the environmental disturbances, such as the wind, current or wave swells, thanks to symmetries with shapes that open up expanded possibilities with regards to installation sites. The invention provides flexibility with regards to installation sites that is all the more so substantial as it makes it possible to obtain a floating wind turbine unit with a relatively low draught in relation to what exists which favours the transport and installation of such a unit.

An objective of embodiments of the invention is also to obtain a floating device that has a small size, in particular in relation to existing devices for supporting high-power turbines. As a corollary of this objective, embodiments of the invention aim to propose a floating device that can be adapted quickly to the use of turbines having a power that is greater than that of the turbines currently used in floating wind turbine units, without modifying the architecture of the floating device.

The characteristics linked to the orientation in space are given throughout the document when the floating unit is floating on an aquatic mass at rest, i.e. with a horizontal surface in the absence of wind, current and wave swells. The vertical direction is defined by the direction of the force of gravity, with the field of the force of gravity pointing downwards. Any direction orthogonal to the vertical direction is horizontal.

Embodiments of the invention relate to a floating device for supporting an offshore wind turbine and comprising:
- a central floating pillar arranged for fixedly receiving a tower of the wind turbine,
- at least three peripheral floaters,
- one leg per floater, each leg extending in a radial longitudinal direction in relation to the central pillar and each leg comprising a proximal end that is secured to the central pillar and a distal end that is secured to said floater,
- the device being characterized in that the legs comprise:
  - an outer tubular element, which extends in the longitudinal direction of the leg and has a curved cross-section perpendicularly to the longitudinal direction, and
  - an inner tubular element, which extends in the longitudinal direction of the leg and has a polygonal cross-section perpendicularly to the longitudinal direction, the polygonal cross-section being inscribed in the curved cross-section.

The nesting of the inner tubular element with a polygonal cross-section in the outer tubular element with a curved cross-section allows for a good distribution of the forces and therefore good mechanical resistance. The inner tubular element, thanks to its polygonal cross-section, makes it possible to take up the bending in the plane, generated by the force of the wind on the turbine, and the alternating bending in the plane, induced by the roll, pitch and heave movements. The outer tubular element, thanks to its cross-section delimited by a closed curve, makes it possible to transmit the forces of external pressure in compression along the outer tubular element. Furthermore, the hull of the outer tubular element and the hull of the inner tubular element form a double hull, which reduces the risks of infiltration and therefore increases the safety of the floating device. The hollow and voluminous nature of the legs provides floatability.

According to a particular embodiment, the legs comprise compartments able to be filled at least partially with a ballast in such a way as to adjust the floatability of the legs in order to prevent the appearance of additional bending forces that are undesirable due to the high disparities in floatability.

According to a particular embodiment, the floating device further comprises at least two connection parts per pair of adjacent legs, each connection part comprising a first and a second ends secured respectively in the vicinity of the distal ends of the first and second legs of the pair of adjacent legs. The connection parts provide a mechanical continuity between the legs in order to limit the out-of-plane moments that generate deflected bending.

According to a particular embodiment, the legs extend horizontally. This embodiment is preferable in particular when the waterline passes through the leg. Indeed, in this case, additional forces are able to appear if the legs are not horizontal.

According to a particular embodiment, with radial planes each being defined by the longitudinal direction of a leg and by a vertical direction, the device is arranged in such a way that the radial planes are planes of symmetry of the device. This symmetrical configuration makes it possible to retain a similar behavior regardless of the orientations of the environmental disturbances, such as wind, current or wave swells, in such a way as to expand the scope of possible installation sites.

According to a particular embodiment, the floating device comprises four peripheral floaters. This number of four floaters allows for a good compromise between the size and the hydrostatic performance of the floating wind turbine unit, i.e. it makes it possible to have good floatability despite a relatively reduced leg length.

According to a particular embodiment, the peripheral floaters comprise inner partitions. Partitioning makes it possible to provide the stability of the floater as a whole in case of damage, for example with a compartment filled with water.

According to a particular embodiment, the central pillar comprises a securing part comprising a hollow volume for receiving the tower of the wind turbine, the hollow volume being cylindrical or truncated in such a way as to hug the shape of the tower. As the shape of the tower of the wind turbine is not standard, the securing part makes it possible to adapt the same floating device on several types of wind turbines.

According to a particular embodiment, the central pillar is hollow in such a way as to have a sufficient floatability to support the wind turbine. This makes it possible to prevent the appearance of additional bending forces that are undesirable due to the high disparities in floatability.

According to a particular embodiment, the central pillar has, horizontally, a polygonal cross-section of which the number of sides is equal to double the number of legs in such a way that the legs are respectively secured to sides of the polygonal cross-section that are not adjacent between them. This geometry makes it possible to achieve a weight/volume ratio that favours the floatability of the central pillar.

According to a particular embodiment, the floaters comprise a truncated lower portion with a vertical axis and a cylindrical upper portion with a vertical axis. The shape of the floaters makes it possible to provide a substantial volume of floatability and good mechanical resistance to hydrostatic forces. In particular, the main objective sought is to limit the movements, accelerations and forces on the turbine thanks to a substantial damping.

According to a particular embodiment, the floating device is made, at least partially, from reinforced concrete. Concrete has very good resistance to fatigue and to extreme environments. It also makes it possible to avoid the phenomenon of stress concentration in terms of welds, in particular for complex connections of the "angled" type, which are very expensive in terms of steel. Concrete furthermore makes it possible to produce elements of substantial size, in particular with regards to floaters. Large-size floaters make it possible to reduce the overall size of the unit while still retaining good floatability because they make it possible to reduce the length of the legs. Concrete also has the advantage of being less expensive than steel for standard use.

According to a particular embodiment, the floating device comprises portions made of steel, for example the reinforcing parts. Steel resists traction forces contrary to concrete therefore steel is particularly indicated for reinforcing parts that work mainly in traction. Furthermore, as steel is a relatively light material, it makes it possible to limit the additional mass due to the reinforcing parts.

According to a particular embodiment, the floating device further comprises an anchoring system.

Embodiments of the invention also relate to a floating wind turbine unit comprising:
a device according to any preceding claim, and
a wind turbine.

BRIEF DESCRIPTION OF THE DRAWINGS

Other characteristics and innovating advantages shall come from the description hereinafter, provided for the purposes of information and in a non-limiting manner, in reference to the accompanying drawings, wherein.

DETAILED DESCRIPTION

Figure 1:
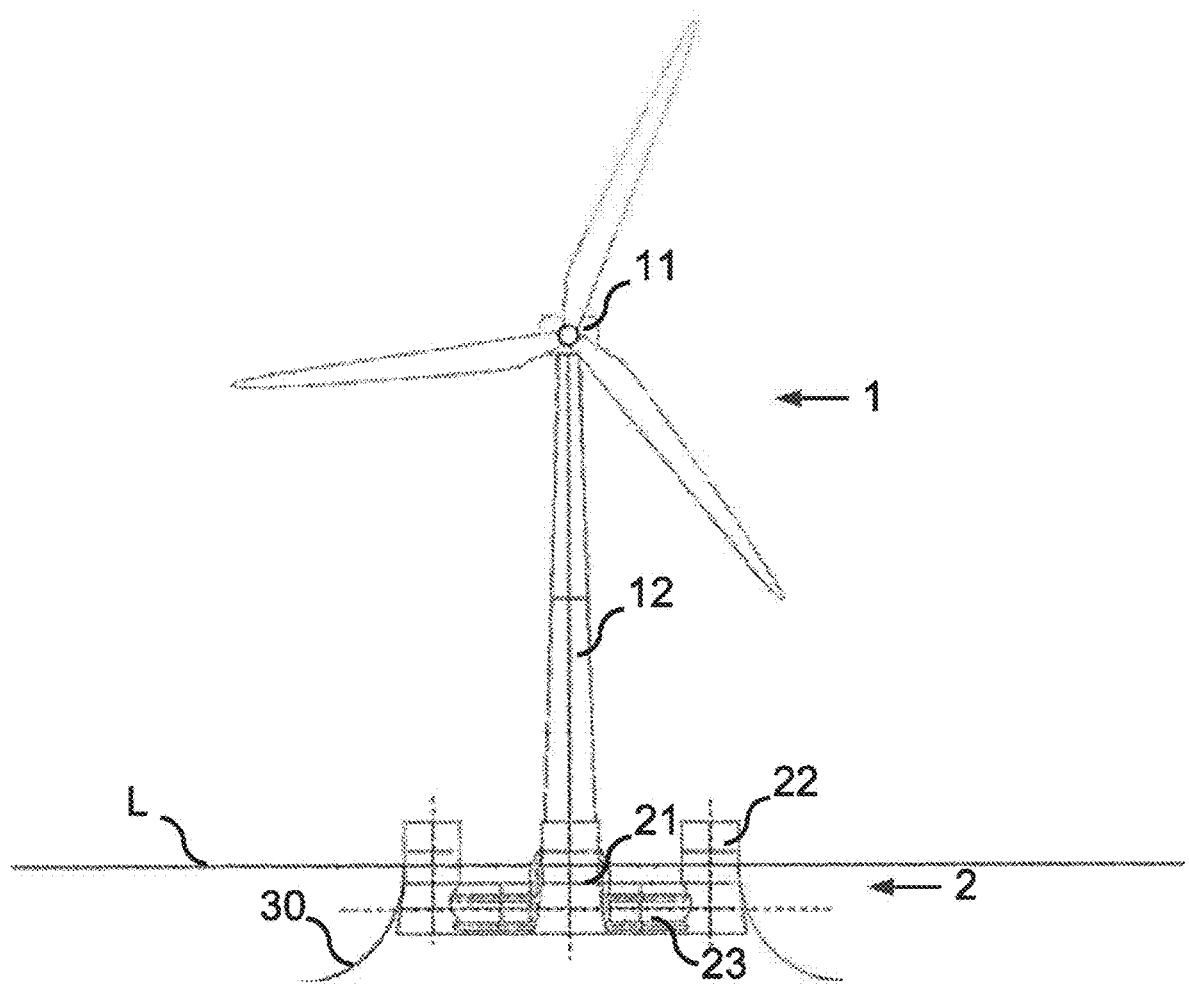
FIG. 1 shows a front view of a floating wind turbine unit according to embodiments of the invention.
Figure 2:
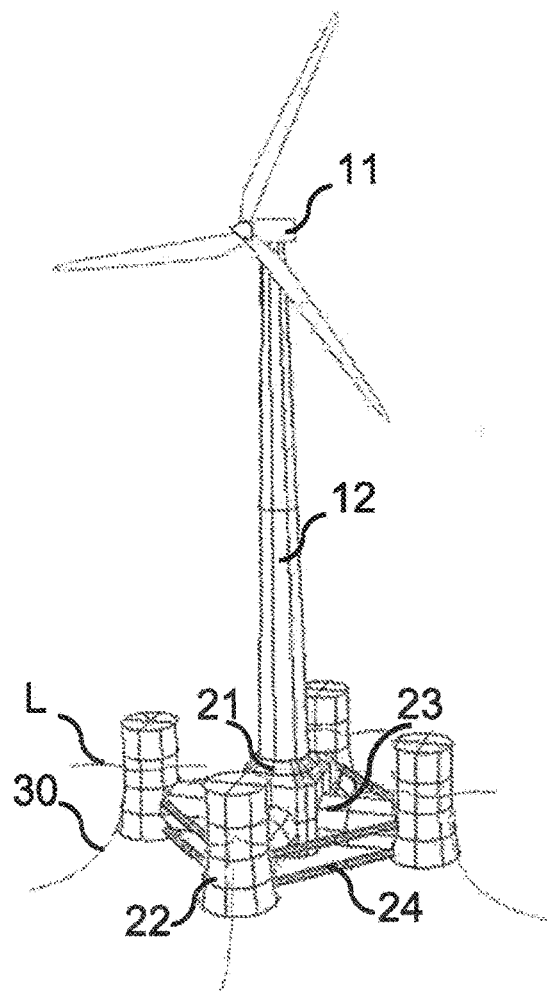
FIG. 2 shows a perspective side view of the floating wind turbine unit of FIG. 1.
Figure 3:
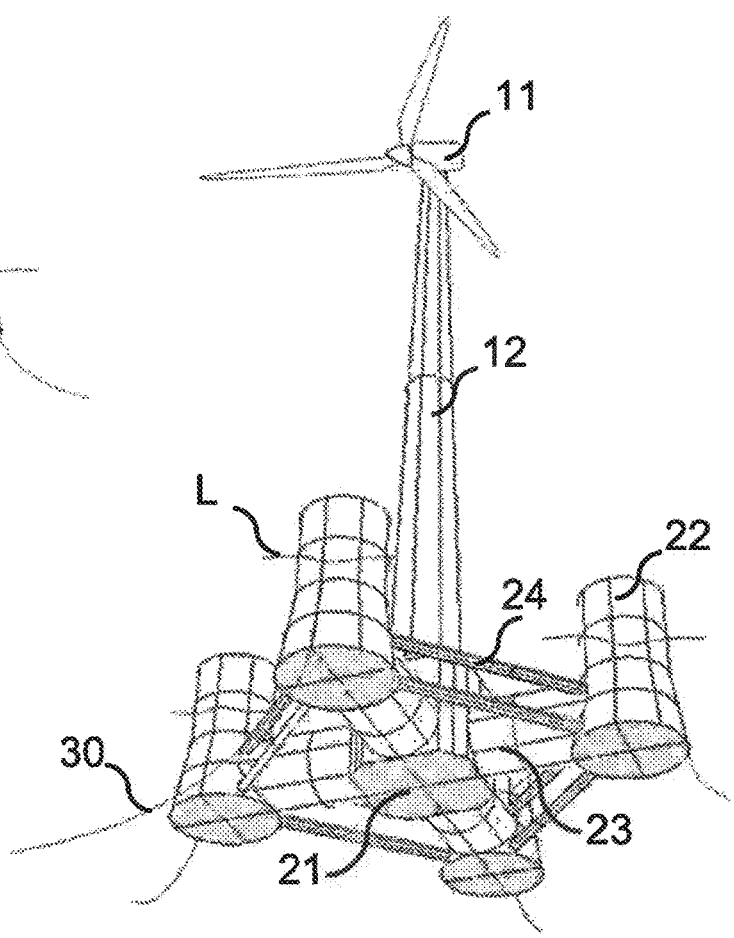
FIG. 3 shows a perspective bottom view of the floating wind turbine unit of FIGS. 1 and 2.

FIGS. 1 to 3 show a floating wind turbine unit according to embodiments of the invention. The floating wind turbine unit comprises a wind turbine 1 and a floating device 2 for supporting the wind turbine 1.

The wind turbine 1 comprises a turbine 11 and a tower 12 supporting the turbine 11. The turbine 11 is adapted for use offshore and has a power of several megawatts. Preferably, it is a three-bladed turbine with a horizontal axis. The tower 12 is comprised of cylindrical elements advantageously made from steel without longitudinal stiffening. The upper portion of the tower 12 is arranged to receive the turbine 11.

Figure 4:
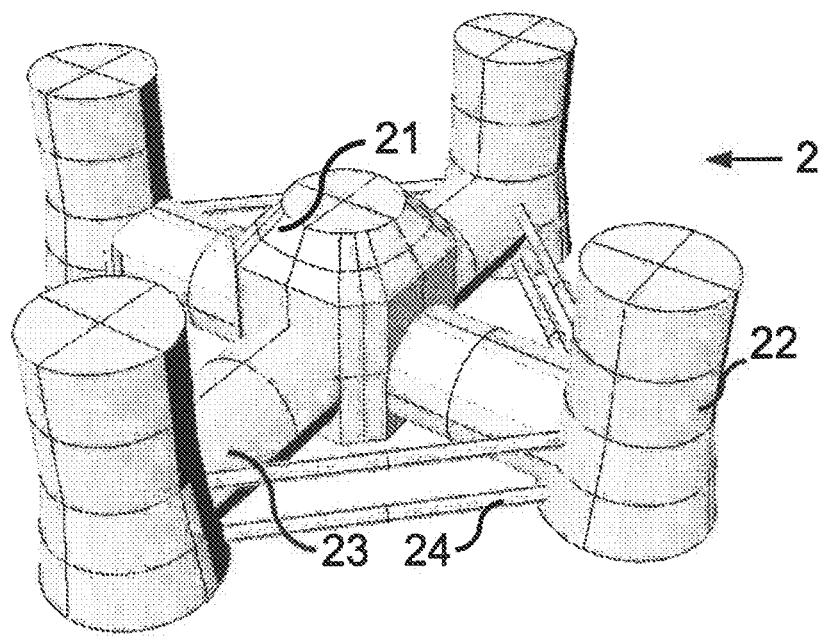
FIG. 4 shows a perspective view of a floating device according to embodiments of the invention.

In reference to FIG. 4, the floating device 2 comprises a central floating pillar 21 arranged for receiving the tower 12, at least three peripheral floaters 22, one leg 23 per floater and advantageously at least two connection parts 24 per pair of adjacent legs 23.

Figure 6:
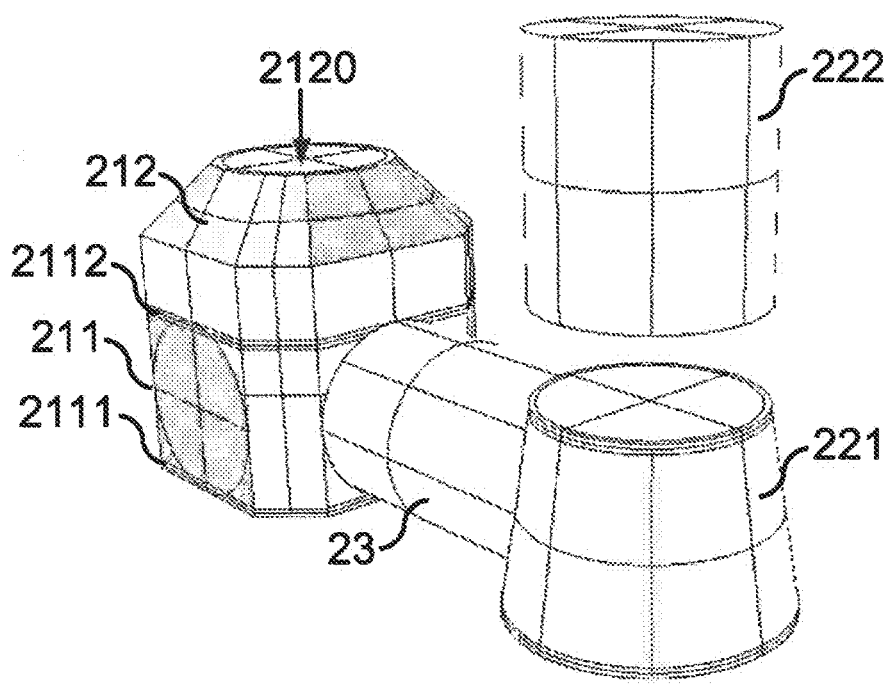
FIG. 6 shows a partial and exploded view of the floating device of FIGS. 4 and 5.

In reference to FIG. 6, the central pillar 21 comprises a trunk 211 having the shape of a straight prism with a vertical generatrix. The trunk 211 comprises a lower face 2111 and a lower face 2112 that are polygonal. The lower face 2111 and the lower face 2112 are horizontal. The lower face 2111 comprises a slab whereon rests the base of the tower 12 of the wind turbine 1. Furthermore, the central pillar 21 comprises a securing part 212 comprising a hollow volume 2120 for receiving the tower 12 of the wind turbine 1, the hollow volume 2120 being cylindrical or truncated in such a way as to hug the shape of the tower 12. The securing part 212 is preferably a part made of steel secured to the inside of the central pillar 21. For example, the central pillar 21 being made of concrete, the securing part 212 is taken in the concrete of the pillar. The securing part 212 is adapted to the wind turbine 1 as the floating device 2 is for receiving. On the other hand, the rest of the floating device 2 is designed in such a way as to be able to receive a wide diversity of wind turbines.

The central pillar 21 is hollow in order to provide the floatability required to support the wind turbine 1. The central pillar 21 comprises compartments that can be filled at least partially with ballast. The ballast is for example seawater or another solid, liquid or granular material, denser than seawater, making it possible to adjust the mass of the unit of the system in order to adjust the draught for dock operations, transit operations or an installation on site. In the case of a liquid ballast, adapted means for adjustment are for example means for pumping liquid that make it possible to add or to remove ballast within compartments suitable for ballasting.

According to a preferred embodiment, the central pillar 21 is made at least partially of reinforced concrete in order to resist the cyclical stresses of fatigue generated in particular by the movements of the wind turbine 1.

According to a particular embodiment, the central pillar 21 is made at least partially from steel although steel does not resist fatigue as well as concrete does.

The peripheral floaters 22 comprise a truncated lower portion 221 and an upper cylindrical portion 222. The truncated lower portion 221 and the upper cylindrical portion 222 extend according to a vertical axis. Here, the vertical axis is a rotational axis of symmetry of the floaters. At the interface between the truncated lower portion 221 and the upper cylindrical portion 222, the diameter of the two portions is identical. The interface between the truncated lower portion 221 and the upper cylindrical portion 222 is materialized by a slab. The truncated portion flares towards the bottom in such a way as to provide a better hydrodynamic damping in order to improve the dynamic behavior of the platform. The lower base of the truncated portion is materialized by a slab. Preferably, in the truncated portion, the diameter of the lower base is greater than the height.

The geometry of the floaters 22 makes it possible to provide a substantial volume of floatability and a mechanical resistance to the hydrostatic forces. According to a preferred embodiment, the waterline L is located at the level of the cylindrical portion of the floaters.

The floaters are dimensioned so that the periods that are proper to the floaters in roll and pitch are beyond the energy periods of the wave swell.

The upper cylindrical portion 222 comprises a platform that forms a planar surface intended to allow for human intervention or a fastening of devices required for the operations of towing, installation, or maintenance for example.

The floaters 22 further comprise a partitioning device inside the upper and lower portions that makes it possible to provide stability for the floater as a whole in case of damage, for example with a pillar filled with water.

With the same principle as that of the central pillar 21, the floaters 22 comprise compartments able to be filled at least partially with ballast. The ballast is for example seawater or another solid, liquid or granular material, denser than seawater, making it possible to adjust the overall mass of the system in order to adjust the draught for dock operations, transit operations or an installation on site. In the case of a liquid ballast, adapted means for adjustment are for example means for pumping liquid that make it possible to add or to remove ballast. The compartments intended for the ballast are located far from the axis of the floater 22 and in the lower portion so as to contribute to the stability of the system by increasing its inertia in roll and pitch.

According to a preferred embodiment, the floaters 22 are made at least partially from reinforced concrete in order to resist the stresses coming from the wind turbine 1, from the aquatic environment and from the dynamics of the floating device 2.

According to a particular embodiment, the floaters 22 are made at least partially from steel.

Preferably, the floating device 2 comprises between three and eight floaters 22 and in particular four floaters 22. The number of floaters 22 is calculated in order to retain a relatively small size in relation to floating devices for supporting high-power turbines and for remaining within a range of inclination during operation and an extreme environment that is compatible with the use of existing turbines.

Figure 7:
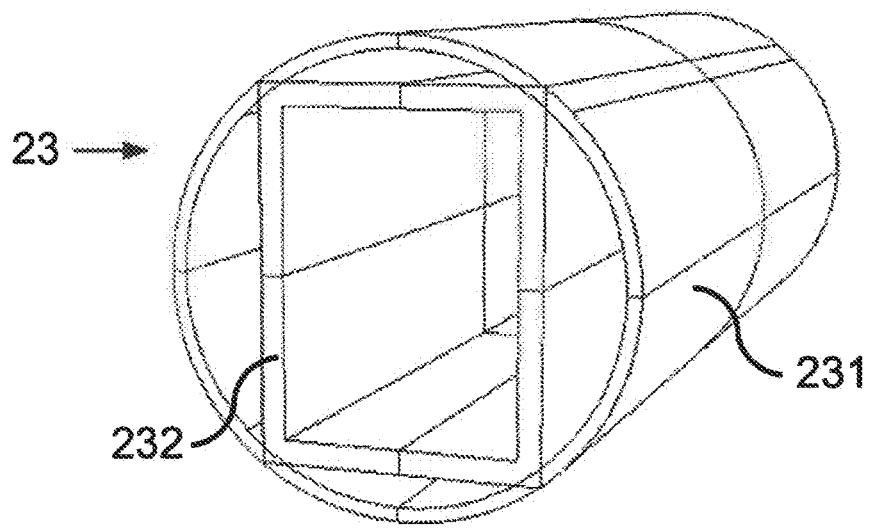
FIG. 7 shows a vertical cross-section of a leg of the device of FIGS. 4 to 6, FIGS. 8*a* and 8*b* diagrammatically show the transmission of bending forces from a wind turbine to a leg in a floating wind turbine unit according to embodiments of the invention, FIG. 9 diagrammatically shows the transmission of the compression forces in a leg of a floating device according to embodiments of the invention.

The legs 23 extend in a radial longitudinal direction in relation to the central pillar 21 and each leg 23 comprises a proximal end secured to the central pillar 21 and a distal end secured to a floater 22 associated with the leg 23. In reference to FIG. 7, the legs 23 further comprise an outer tubular element 231 and an inner tubular element 232. The inner and outer tubular elements extend in the longitudinal direction of the leg 23. The outer tubular element 231 has a curved cross-section, here, circular perpendicularly to the longitudinal direction. The inner tubular element 232 has polygonal cross-section, here, rectangular perpendicularly to the longitudinal direction. The rectangular cross-section is inscribed in the circular cross-section, the vertices of the rectangular cross-section being secured to an inner wall with a circular cross-section. The geometry corresponding to a rectangular cross-section inscribed in a circular cross-section is studied to take up the forces coming from the turbine and from the marine environment. Furthermore, the hull of the outer tubular element 231 and the hull of the inner tubular element 232 form a double hull, which reduces the risks of infiltration and therefore increase the safety of the floating device 2. The inner tubular element 232, thanks to its rectangular cross-section, makes it possible to take up the bending in the plane, generated by the force of the wind on the blades of the turbine, and the alternating bending in the plane, induced by the roll, pitch and heave movements. Indeed, the inner tubular element 232 which has a rectangular cross-section comprises slabs located in particular in the extension of a top portion and in the extension of a bottom portion of the circular cross-section of the leg 23 in order to make it possible to provide continuity in the transmission of forces, in particular of the bending moments transmitted from the wind turbine 1 to the legs 23. FIGS. 8*a* and 8*b* show that the force P generated by the force P of the wind on the blades of the turbine induce a bending moment $F_C$ on the central pillar 21. The bending moment $F_C$ in the central pillar 21 is transmitted in the form of bending moments $F_B$ in the legs 23 having a longitudinal direction that is parallel to the force P. The bending moments $F_B$ in the legs are taken up in the form of stresses $C_H$ in the slab of the top portion of the leg and in the form of stresses $C_B$ in the slab of the bottom portion of the leg.

The outer tubular element 231, thanks to its curved cross-section, makes it possible to take up the external forces of pressure as compression, generated by the aquatic medium. FIG. 9 shows that the external pressure forces in compression C are transmitted to the outer tubular element 231 in the form of peripheral stresses $C_P$. The peripheral stresses $C_P$ in the outer tubular element 231 are then transmitted to the inner tubular element 232 in the form of internal stresses $C_I$.

Alternatively, the curved cross-section is elliptical and/or the polygonal cross-section is triangular, pentagonal or hexagonal.

According to a preferred embodiment, the legs 23 have a cylindrical exterior shape of revolution.

In another embodiment, the legs 23 have an outer truncated shape.

According to a preferred embodiment, the legs 23 extend horizontally. The axes of elongation of the legs 23 are therefore coplanar.

In another embodiment, the axes of elongation of the legs 23 form generatrix of a cone of revolution of which the vertex is located on the axis of the tower 12.

Figure 5:
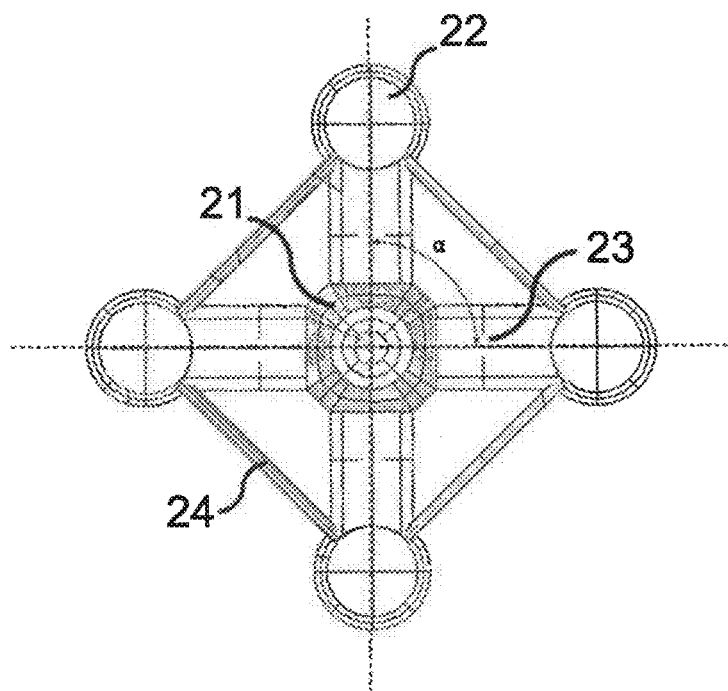
FIG. 5 shows a bottom view of the floating device of FIG. 4.

The longitudinal direction of a leg 23 and the vertical direction define a radial plane. According to a preferred embodiment shown in FIG. 5, the device is arranged in such a way that the radial planes are planes of symmetry of the device. In other terms, the legs 23 are arranged in a star around the central pillar 21 in a regular manner, i.e. the angle α formed by the axes of elongation of two legs 23 of a pair of successive legs 23 is the same regardless of the pair of legs 23 and is equal to 360° that divides the total number of legs 23. This symmetrical configuration makes it possible to retain a similar behavior regardless of the orientations of the environmental disturbances, such as wind, current or wave swells, in such a way as to expand the scope of possible installation sites. In this case, according to a particular embodiment, the turbine comprises a controlled actuator that orients the turbine according to the direction of the wind.

The interfaces between the legs 23 and the central pillar 21 are located in vertical planes. At the interface between a leg 23 and the central pillar 21, the cross-section of the leg 23 is tangent to a side of the polygon that is formed by the lower face 2111 of the trunk 211 of the central pillar 21; the diameter of the cross-section of the leg 23 is less than or equal to the distance between the lower face 2112 and the lower face 2111 of the trunk 211. The trunk 211 has, horizontally, a polygonal cross-section of which the number of sides is equal to double the number of legs 23 in such a way that the legs 23 are respectively secured to sides of the polygonal cross-section that are not adjacent between them. For example, when the floating device 2 comprises four floaters 22 and therefore four legs 23, the lower face 2111 and the lower face 2112 of the trunk 211 are octagonal.

Each leg 23 is secured to the truncated lower portion 221 of the floater that is associated with it. The interface between the leg 23 and the truncated lower portion 221 is an angle, according to a structure that is conventionally used in the field of pipework. At the interface between the leg 23 and the truncated lower portion 221, the cross-section of the leg 23 is tangent in the lower portion to the base of the truncated lower portion 221 and in the upper portion at the interface between the truncated lower portion 221 and the upper cylindrical portion 222. Thus, the transmission of the forces is provided between the leg 23 and the slab that constitutes the base of the truncated lower portion 221 and between the leg 23 and the slab that constitutes the interface between the truncated lower portion 221 and the upper cylindrical portion 222.

The legs 23 are arranged in such a way as to delimit a volume that is sufficient to have positive floatability and are designed hollow. With the same principle as that of the central pillar 21 and of the floaters 22, the legs 23 comprise compartments that can be filled at least partially with ballast. The ballast is for example seawater or another solid, liquid or granular material, denser than seawater, making it possible to adjust the mass of the unit of the system in order to adjust the draught for dock operations, transit operations or an installation on site. In the case of a liquid ballast, adapted means for adjustment are for example means for pumping liquid that make it possible to add or to remove ballast in said compartments.

According to a preferred embodiment, the legs 23 are entirely submerged in operation in such a way as to guarantee a behavior that is acceptable from the standpoint of movements and of the forces undergone in extreme conditions, i.e. when the wind turbine 1 is stopped and in the case of a strong wave swell. According to another embodiment, the legs 23 are partially submerged.

According to a preferred embodiment, the legs 23 are made at least partially from reinforced concrete in order to better resist the fatigue stresses and the extreme loads coming from the turbine 11 and from the aquatic environment.

According to a particular embodiment, the legs 23 are made at least partially from steel.

The connection parts 24 connect the legs 23 in pairs and extend horizontally. Each connection part 24 comprises a first and a second ends secured respectively in the vicinity of the distal ends of the first and second legs 23 of said pair of adjacent legs 23. The connection parts 24 that connect the same pair of legs 23 are located in the same vertical plane. The connection parts 24 provide a mechanical continuity between the legs 23 in order to limit the out-of-plane moments which generate deflected bending. These connection parts 24 have a cross-section of small size in relation to the dimensions of the other elements.

According to a preferred embodiment, the connection parts 24 are made of steel because they work mainly in traction, yet steel resists the forces of traction contrary to concrete.

According to an embodiment, the floating device 2 comprises means of anchoring. The anchoring means are a set of lines 30 that connect the platform to a fixed external element, for example, the bottom of the aquatic mass on which the platform is floating. The lines 30 comprise a first end connected to the floating device 2 in one or several points and a second end connected to the fixed external element, for example by the intermediary of an anchor or of a dead body. The lines 30 can be comprised of cables, chains or other flexible elements adapted to the maintaining in position of a floating object subjected to drift forces under the effect of the environment. According to particular embodiments, the lines 30 are fully or partially stretched vertically or on a slant.

In an alternative embodiment, the lines 30 are catenaries.

According to a mode of use, the draught of the floating wind turbine unit is low, for example of about ten meters not ballasted and of about fifteen meters ballasted, in order to facilitate the operations of towing and installation.

Alternatively, the draught is identical between the installation phase and the operational phase which avoids the operations of ballasting/de-ballasting on the production site. The draught can however be adjusted by ballasting once on the production site.

Embodiments of the invention are described hereinabove by way of example. It is understood that those skilled in the art are able to produce various alternatives of the invention, by associating for example the various characteristics hereinabove taken individually or in combination, without however leaving the scope of the invention.

The invention claimed is:

1. A floating device for supporting an offshore wind turbine, comprising:
   a central floating pillar arranged for fixedly receiving a tower of the offshore wind turbine;
   at least three peripheral floaters, each of the at least three peripheral floaters including at least one leg, each leg extending in a radial longitudinal direction in relation to the central floating pillar and comprising a proximal end secured to the central floating pillar and a distal end secured to a respective peripheral floater of the at least three peripheral floaters;
   wherein each leg further comprises:
      an outer tubular element in extending along the radial longitudinal direction having a curved cross-section perpendicular to the radial longitudinal direction, and
      an inner tubular element extending along the radial longitudinal direction having a polygonal cross-section perpendicular to the radial longitudinal direction, the polygonal cross-section being inscribed in the curved cross-section of the outer tubular element.

2. The floating device of claim 1, further comprising at least one connection member positioned between each pair of adjacent legs, each connection member comprising a first end and a second end secured in proximity to the respective distal ends of each pair of adjacent legs.

3. The floating device of claim 1, wherein the legs extend horizontally with respect to a gravitational frame of reference.

4. The floating device of claim 1, wherein the at least three peripheral floaters are symmetrically positioned around the central floating pillar.

5. The floating device of claim 1, wherein the central floating pillar comprises a securing member comprising structure defining a hollow volume for receiving a tower of the offshore wind turbine, the hollow volume being cylindrical or truncated in such a way as to hug the shape an outer dimension of the tower.

6. The floating device of claim 1, wherein the central floating pillar comprises a polygonal cross-section having a number of sides, wherein the number of sides is equal to double the number of legs, and wherein the legs are respectively secured to non-adjacent sides of the polygonal cross-section.

7. The floating device of claim 1, wherein the at least three peripheral floaters comprise a truncated lower portion with a vertical axis and a cylindrical upper portion with a vertical axis.

8. The floating device according to any of claim 1, wherein the floating device is made, at least partially, of reinforced concrete.

9. The floating device of claim 1, wherein the floating device comprises portions made of steel.

10. A floating wind turbine unit, comprising:
   a floating device according to claim 1, and
   the offshore wind turbine.

* * * * *

UNITED STATES PATENT AND TRADEMARK OFFICE
CERTIFICATE OF CORRECTION

PATENT NO. : 10,787,233 B2
APPLICATION NO. : 16/312085
DATED : September 29, 2020
INVENTOR(S) : Gatesoupe et al.

Page 1 of 1

It is certified that error appears in the above-identified patent and that said Letters Patent is hereby corrected as shown below:

In the Claims

Column 10, Claim 8, Line 38:
Delete "according to any".

Signed and Sealed this
Tenth Day of November, 2020

Andrei Iancu
*Director of the United States Patent and Trademark Office*